June 25, 1940.  J. R. MORRISON  2,205,628
WELDING ROD PROCESSING EQUIPMENT
Filed Jan. 9, 1937  3 Sheets-Sheet 3

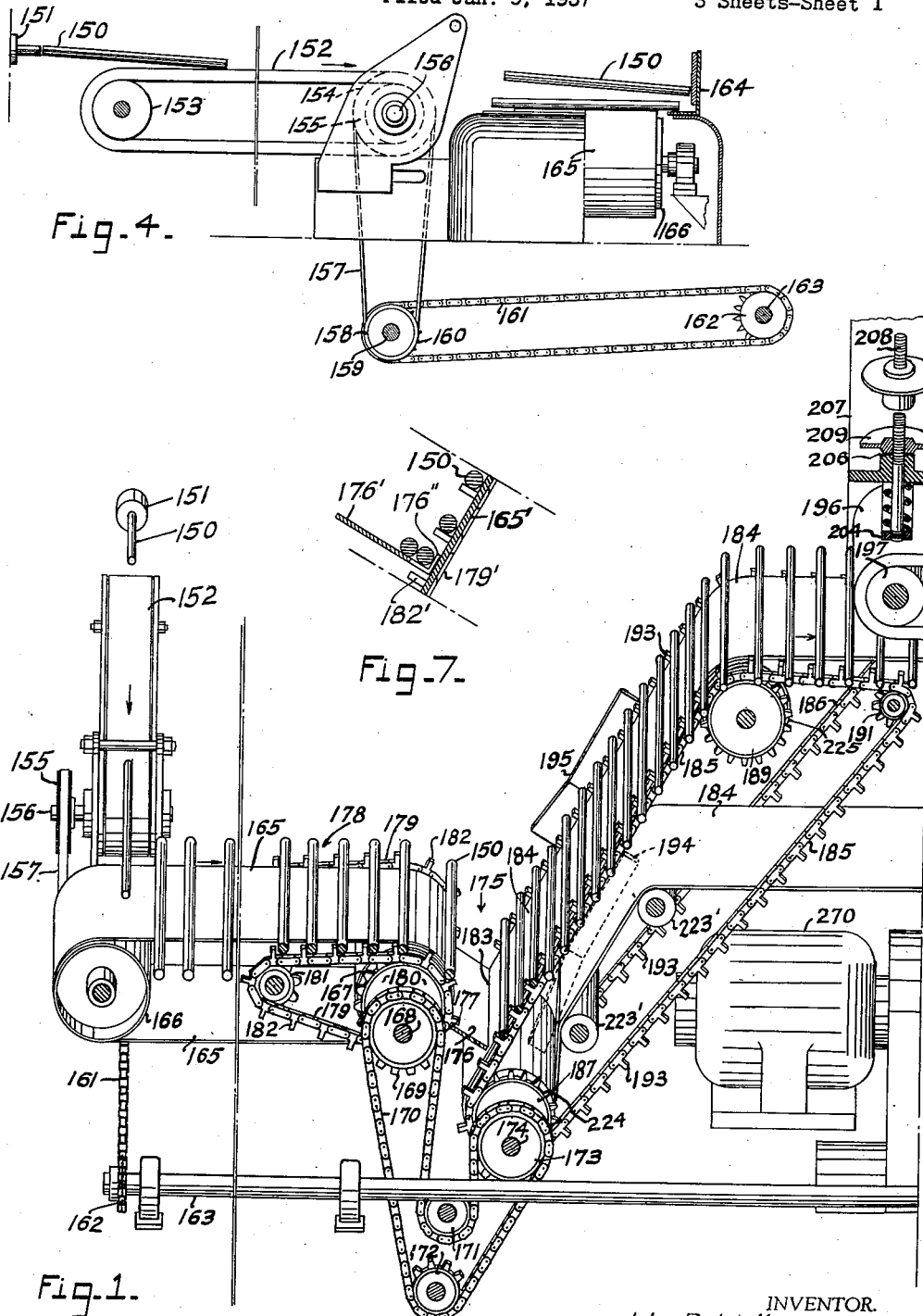

INVENTOR.
John Ralph Morrison
BY
Louis J. McBane
ATTORNEY.

Patented June 25, 1940

2,205,628

UNITED STATES PATENT OFFICE 2,205,628

WELDING ROD PROCESSING EQUIPMENT

John R. Morrison, Hudson, Ohio

Application January 9, 1937, Serial No. 119,773

8 Claims. (Cl. 18—1)

This invention relates to equipment for handling and processing welding rods as they come from an extruding machine, and for loading the rods onto a conveyor adapted to carry the rods through a baking oven.

While the invention is described in connection with welding rods, this serves as but one illustration of the usefulness of the invention, other equipment, useful for handling and processing other articles of manufacture, having substantially the same mode of operation is contemplated within the purview of this invention.

Welding rods consist of a core of metal and a coating of material. It is common practice to coat the core of the rod by passing the core through an extruding machine. The cores are supplied to the extruding machine in continuous succession, the ends of adjacent rods abutting. The coating material is supplied to the extruding machine in a plastic mass, and the machine operates to coat the cores with a shell of the material as the cores pass through the machine.

As the rods issue from the extruding machine, the cores are in end to end abutting relation and the shell of coating material connects the successive rods. The first operation is to separate the rods. It is an object of this invention to provide equipment which automatically and continuously receives and separates successive welding rods as they issue from the extruding machine.

While, in the broader aspects of the invention, the direction of movement of the rods, for effecting separation, may be chosen arbitrarily, endwise forward movement of the rods is found practicable for effecting rod separation. In the interest of space conservation and economy of operation, sidewise movement of the rods, by the rod conveyor, is desirable. It is an object of this invention to provide rod separation by endwise movement, to provide for conversion of endwise rod movement to sidewise rod movement, incident to loading a conveyor for conveying rods sidewise.

The welding rods must have a portion of the coating stripped off so as to expose the core at one end of the rod. The bare, exposed core serves as the electrical terminal for the welding rod to which suitable electrical connections may be attached in a familiar manner. The end of the rod, intended for contact with the weld, may have some of the coating material adhering thereto, deposited incident to the separating operation. The weld end of the rod should be bare and free of any adhering material so that the rod will be effective at once when it is necessary to change rods during a welding operation. Also, the coating on the core, which comes from the extruding machine in a plastic, soft condition, must be baked to set and harden that coating. Welding rods are made in large quantity and in a continuous production process where the rods follow one another through the processing steps in close sequence of successive rods. To handle the volume of production without interruption, the welding rods must be introduced to the equipment, for effecting the processing steps beforementioned, in a regular and predetermined manner. It is an object of this invention to provide rod handling equipment which operates to arrange the rods in a predetermined manner and continuously to advance the uniformly arranged rods successively to and through the processing equipment. It is also an object of this invention to provide equipment for stripping a portion of the coating from an end of the welding rods to provide for cleaning the weld end of the rod, and to provide equipment for continuously advancing the welding rods to and through the stripping and cleaning operations in a predetermined, regular order, and to effect these functions automatically.

This invention is related to that disclosed in my copending application, Serial Number 111,047, filed November 28, 1936, for Conveyors. That application discloses conveyor equipment for moving welding rods in continuous succession through an oven chamber where the coating is baked. It is an object of the present invention to provide equipment for automatically loading rods onto conveyor equipment such as disclosed in my co-pending application.

It is an object of this invention to provide equipment which operates continuously to receive welding rods issuing from an extruding machine, to separate the successive welding rods, to arrange the welding rods in a predetermined order and position, continuously to advance the welding rods to and through stripping and cleaning operations and continuously to advance the rods and to load those rods onto a conveyor such as disclosed in my co-pending application.

Other objects and advantages of the present invention will appear in the following description taken in connection with the accompanying drawings, in which:

Figures 1, 2, and 3 are views, in a perspective, illustrating successive parts of equipment embodying this invention.

Figure 4 is a view, in side elevation and section, illustrating that part of the equipment which receives the welding rods issuing from the extruding machine and which separates and passes along those welding rods.

Figure 7 is a detail view, in section, illustrating a variation in the structure shown in Figure 1.

Figure 6:
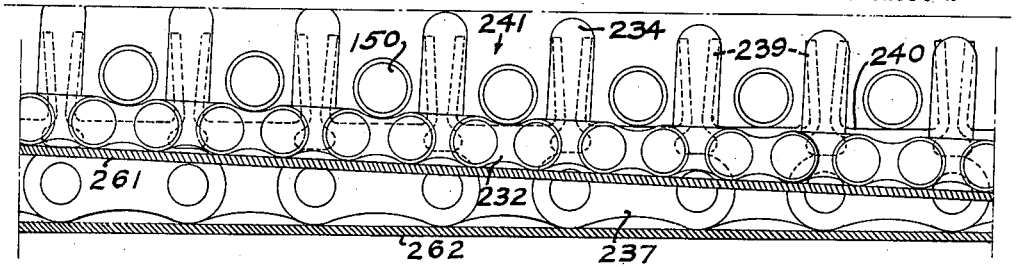
Figure 6 is a detail view, in side elevation, illustrating the operation of loading the rod conveyor.

It is uniform practise to coat welding rods. Extruding machines commonly are used for that purpose. In the broader aspects of this invention, it is not limited to extruding machines for effecting the coating operation. Other devices, having modes of operation different from that of the extruding machine may be used for effecting the coating operation and may be combined with the other processing equipment herein disclosed, within the purview of this invention. The extruding machine has a characteristic mode of operation in that rods issue therefrom with endwise movement. This circumstance conditions the subsequent rod handling steps and equipment, as will appear in the following description. Other rod coating equipment, not characterized by endwise rod movement, may be combined with the rod handling and processing equipment, herein disclosed, without departing from the scope of the invention, broadly claimed, although a somewhat different manner of initially handling the rods issuing from the coating operation may be entailed. Coating technique inherently free of any connection between successive rods, and not requiring any rod separating operation are contemplated within the purview of this invention, as broadly claimed.

In Figure 1, welding rods 150 issue from the die 151 of the extruding machine. The construction and operation of the extruding machine both are conventional and, therefore, are not disclosed in detail. The extruding machine operates to coat the rods with a shell of plastic material.

The issuing welding rods cling together at the adjacent juxtaposed ends due to the presence of the shell of coating material. And, the welding rods follow one another in rapid succession in abutting end to end relation. At this point, the problem is to separate the welding rods and to start the successive welding rods in the sequence of movement as required by the exigencies of production and processing. Both objectives are effected by a belt 152. Since the rods issue from the extruding machine with endwise movement, it is convenient to effect separation of the rods by an operation of drawing the rods apart in lengthwise direction. However, except for the proximately following operations, subsequent handling and processing of the rods are not contingent upon the direction of movement in the rod separating operation. Therefore, rod separating technique and equipment involving other than lengthwise movement of the rods are contemplated within the broader aspects of the invention. Belt 152 effects rod separation in lengthwise direction.

The belt 152 is trained over pulleys 154 and 153. The belt 152 is driven at the pulley 154 by a pulley 155 mounted upon the shaft 156 of the pulley 154. Belt 157 is trained over pulley 155 fixed on shaft 156. The belt 157 is trained over pulley 158 fixed on the shaft 159, which carries a sprocket 160. Chain 161 is trained over the sprocket 160 and over sprocket 162. Sprocket 162, fixed onto shaft 163, supported in suitable bearings, is driven from a suitable source of power later to be described.

The direction of the movement of the belt 152 is indicated by the arrows in Figures 1 and 4.

At one end, the belt 152 is arranged in front of and slightly below the face of the die of the extruding machine. The welding rods issuing from the extruding machine project over and slightly above the adjacent end of the travelling belt 152. The rigidity afforded by the core of the welding rod supports the rod in this position until a length of core is substantially clear of the die. At that time, due to the plasticity of the coating material at the joint between the rods, the end of the welding rod, distant from the die, falls onto the travelling conveyor belt 152. Due to the cohesion of the coating material, the joint between successive cores tends to persist. The rate of travel of the belt 152 is considerably greater than the speed at which the welding rods issue from the die. Consequently, when one end of a welding rod drops down onto the surface of the travelling belt 152, the frictional engagement between the end of the welding rod and the belt causes the welding rod to be pulled free from the following rod. In order to insure provision of adequate frictional force in the region of contact between the end of an issuing welding rod and the surface of conveyor belt 152, the belt is provided with a special surface material. Soft rubber composition, sponge rubber for example, has been found to be highly satisfactory for that purpose since it affords the requisite frictional contact with the welding rod and is well adapted to the requirements of service for a conveyor belt. The rapid rate of travel of the conveyor belt not only pulls successive issuing rods apart, but it also spaces successive rods from one another to an extent as required by the following handling operations.

The frictional contact between the soft rubber surface of the belt 152 and the end of an issuing welding rod tends to rub off and to mar that portion of the coating, which first engages with the belt. However, one end of the extruded shell must be stripped off to provide for electrical connection, so that such damage to the shell may be rendered unobjectional by stripping that end of the rod to expose the core.

The operation of the belt 152 in separating the rods is but one illustration of technique and equipment for separating the rods issuing from the extruding machine, in an endwise direction. Essentially, the problem consists in severing the connection, afforded by the shell of plastic material, between rod ends, in spacing successive rods for convenience in subsequent handling, without important deleterious effects on the rod, particularly the soft, plastic coating. It will be clear to those skilled in the art that other devices, operating differently, may be provided for engaging the rods and pulling them apart in lengthwise direction and for spacing the successive rods. The combination of such alternative equipment with other parts of the rod handling and treating equipment, herein disclosed, is within the purview of this invention.

The movement of the welding rods when issuing from the extruding machine necessarily is in a lengthwise direction, the welding rods must be pulled apart, and the operation of separating the successive welding rods is effected to best advantage by pulling them apart in lengthwise direction, therefore, the first handling step provides lengthwise movement of the rods.

However, for reasons of economy of space and other reasons, which will become apparent in the subsequent description, it is desirable, in subsequent handling operations, to advance the successive rods in a direction transverse to the rods. Accordingly, the endwise movement of the welding rods afforded by the conveyor belt 152 next is converted to sidewise movement of the welding rods.

The coating on the welding rods is soft and plastic and handling operations are conditioned by the circumstance that the coating must not be marred substantially.

The problem of converting endwise to sidewise movement largely consists in effecting the change without compounding the two movements. Either, the endwise movement should be brought to an end before beginning the sidewise movement or the sidewise movement should be started with sufficient force and constriction as to override any momentum of endwise movement. In so far as the combination with the other rod handling and processing instrumentalities, herein disclosed, is concerned, the particular mode of operation and form of equipment for effecting the change from endwise to sidewise rod movement may be varied widely, within the scope of the claims relating to such combination. The particular equipment disclosed herein effects that change by bringing endwise movement substantially to an end and then beginning sidewise movement. This avoids damage to the coating material.

To effect the conversion of the lengthwise movement of the welding rods to a sidewise movement, it is essential that the whole length of the welding rod be discharged from engagement with the belt 152 before such transverse movement of the welding rods begins, otherwise the combination of the two movements would cause the welding rods to be arranged askew. This objective is satisfied by moving the belt 152 at a sufficiently high rate of speed to project the welding rods in flight from the forward end of the belt. To avoid spinning movement, the rods should be projected with sufficient velocity so that no great tilting of the welding rods can occur.

The flight of the welding rods projected from the forward end of the conveyor 152 is stopped by an abutment 164. The abutment 164 is arranged a distance from the end of the belt 152 not much greater than the length of the welding rods so that the distance of travel in flight will be small with a minimum chance for the rods to go askew. The ends of the welding rods strike the abutment 164, thereby arresting endwise movement, and the rods then fall vertically onto the surface immediately before that abutment. The abutment 164 may be faced with rubber, cardboard or some other material which receives the blow without imparting any substantial rebound. As the rods fall from the abutment 164 they are free of substantial endwise momentum and ready to receive sidewise movement without substantial resistance.

A conveyor belt 165 passes through the location where the rods 150 fall after striking the abutment 164. Conveyor belt 165 travels in the direction indicated by the arrows in Figure 1 and operates to receive and to convey the rods in sidewise movement. The conveyor belt 165 is trained over pulleys 166 and 167. Pulley 167 is fixed onto shaft 168, supported in suitable bearings not shown. Sprocket 169 is fixed on shaft 168 and a chain 170 is trained over sprocket 169, over idlers 171 and 172, and over sprocket 173 fixed on shaft 174. Power for driving the belt 165 is supplied from shaft 174 through the chain 170 to the sprocket 169 and shaft 168 of pulley 167. The supply of power to shaft 174 will be described later. Due to the nature of the transfer of the welding rods 150 from the conveyor belt 152 to the conveyor belt 165, it is inevitable that the successive rods will not be perfectly aligned and will lie more or less askew although the general distribution of the rods will be substantially transverse to the direction of travel of the belt 165. The spacing between the welding rods transferred onto the belt 165 may not be uniform. And, the rods will not be in uniform endwise alignment.

To insure trouble-free handling of the rods in subsequent processing it is essential that the rods be uniformly spaced, lie in a uniform direction, and be arranged in uniform endwise alignment.

In order to align the rods in uniform transverse direction the rods are discharged from the belt 165 onto a troughlike structure where the rods fall to the base of the trough and there are arranged in uniform orientation. Such a troughlike structure is indicated generally at 175 and consists, in part, of a plate, 176, supported in any suitable manner on the frame of the machine. The plate 176 is stationary and the edge 177 is adjacent to, but spaced slightly from the surface of the belt 165 as it travels over the pulley 167. The rods discharge from the belt 165 onto the plate 176 as the belt 165 passes around the pulley 167. Due to the curvature of the belt at that location, and due to the more or less askew position of the rods on the belt 165, there is a tendency for the rods to tilt and roll sidewise in discharging from the belt 165 onto the plate 176. To prevent such an event, and to hold the rods more or less in alignment as they are being discharged from the belt 165, guide structures indicated generally at 178 is provided. The structures 178 consist of chains 179 trained over sprockets 180 and 181. Sprockets 180 are fixed on the shaft 168 and are driven in rotation therewith. Sprockets 181 are idlers mounted for rotation in a suitable manner. The chains 179 are disposed along the edges of the upper flight of travel of the conveyor belt 165 and move in unison with the belt. The chains 179 are provided with spaced projections 182, mounted upon the chain links. Sprockets 180 and 181 are of such size and are so located that, at positions adjacent to the sprocket 181 the projections 182 are flush with or slightly below the surface of the belt 165, and at locations adjacent to the pulley 180 the projections 182 extend well above the surface of the belt 165. Thus, as the chains 179 and the belt 165 move in unison, successive projections 182 rise from beneath the belt level at the sprockets 181, and gradually move to positions where they extend more and more above the belt level as the projections approach the sprocket 180. The welding rods being advanced by the belt 165 are caught between the projections 182 and as the belt 165 passes around the pulley 167 the projections 182 serve to support and to restrain the rods from excessive askew movement. In fact, the projections 182 may serve to align, in a transverse direction, those welding rods which happen to fall upon the belt 165 in a nearly correct direction.

The projections 182 are spaced apart a distance which is large compared to the diameter of the rods so as to allow for the lack of uniformity in orientation, and spacing at this stage in the handling of the rods.

The guide structures indicated generally at 178 are not essential. The belt 165 serves to convey the rods 159 to the orientating means. Experience with equipment of this kind has demonstrated that, ordinarily, it will function quite satisfactorily without guide structures 178. Such guide structure, disclosed herein, is an additional feature which, in certain installations, may be useful as auxiliary means merely to aid the belt 165 in the performance of its function.

As the rods 159 discharge from the projections 182 and belt 165 they fall on the plate 176 and roll downwardly and forwardly due to the inclination of the plate. The edge 183 of the plate 176 is juxtaposed to but spaced slightly from a belt 184 which travels in the direction indicated by the arrow in Figure 1. As shown in the drawings, belt 184 is arranged at a steep inclination and that belt, together with the plate 176, provides the trough-like structure 175, the crevice of the trough being along the line of approach between edge 183 of plate 176 and the conveyor belt 184. The rods 159 roll along plate 176 to the bottom of the trough-like structure and there are orientated properly in a transverse direction.

The rods must be moved from the base of the trough-like structure in rapid succession to accommodate the oncoming rods. Movement of the rods up the steep incline of the belt 184 and uniform spacing of the successive rods is attained by providing chains 185 and 186 along the edges of the belt 184, the chains 185 and 186 being trained over sprockets 187, sprockets 189 and sprockets 191, the sprockets on the distant side of belt 184, as viewed in Figure 1, being not shown. Sprockets 187 are fixed on shaft 174 and are driven therefrom. Thus the chains 185 and 186 move in synchronism with the chains 179 and the rate of supply of rods to and removal of rods from the trough-like structure 175 are the same.

The chains 185 and 186 are provided with projections which extend above the surface of the belt 184. As the rods 159 roll down plate 176 the ends of the rods lodge between successive projections 193 and the continued movement of the chains 185 and 186 carries the rods 159 up the incline of the belt 184. The belt 184 moves in unison with the chains. The location of the sprockets 189 is such that the projections 193, in travelling from sprockets 187 and 188 to the sprockets 189, gradually sink below the level of belt 184. Belt 184 continues its movement in a substantially horizontal plane and after the retraction of the projections 193 in the region of sprockets 189, the belt 184 supports and carries the rods in advancing movement.

Guides 194 and 195 are arranged alongside the chains 185 and 186 at a location adjacent to the plate 176 and along the incline of the belt 184. Guide 194 is shown in dotted outline so as to facilitate the illustration of other parts, the guide being located to engage the near rod ends, as viewed in Figure 1. The guides 194 and 195 are spaced far enough apart, at the bottom ends adjacent to the plate 176, so as to receive the welding rods even though the rods be out of alignment in lengthwise direction considerably. The guides 194 and 195 converge toward one another and toward the chains 185 and 186 respectively, in a direction from the plate 176 up the incline of belt 184. As the rods are carried up the incline, the ends of any rods which are out of alignment engage with the guides 194 and 195 and are thrust endwise into alignment with the other rods.

Thus a uniform orientation, uniform spacing and uniform endwise alignment is provided for the successively advancing welding rods.

According to the foregoing description the rods are orientated, spaced, and aligned, in the named order. That order of such operations is not essential and may be otherwise, if desired. And, any two or all three may be combined into a single operation. Variations in the technique and structure for effecting those functions will be apparent to those skilled in the art, which variations are included in the broader combination of this invention, as claimed.

Figure 7 shows a modification. The plate 176' is arranged relative to belt 165' and chains 179' in the same manner as the similar parts, in Figure 1. However, plate 176' is provided with lips 176'' which extend parallel to belt 176', in the direction of belt movement. The rods which fall onto plate 176' roll down against lips 176'' and are so orientated. It may happen that more than one rod will be lodged on plate 176'. The plate 176' is so positioned, relative to chains 179' that the limit of approach of the rods toward belt 165', as determined by lips 176'', is such that the projections 182' will engage only one rod at a time, even though more than one rod be lodged on plate 176'. This structure insures uniform rod spacing. The plate 176' may be mounted adjustably to vary the spacing of lips 176'' from belt 165', to accommodate rods of various sizes.

The coating must be stripped from one end of the welding rod while the coating is still soft, that is before baking. That process is next in line in the mode of operation herein disclosed.

Removal of coating material from the rod obviously may be effected in a variety of ways and by various equipment. Since one of the objectives of this invention is to achieve economy of production by continuously advancing the rods through successive handling and processing operations without delay, it is desirable to strip the rods in the course of their advancing movement. To that end, the problem is to hold the rods securely while stripping and without interruption of the advancing movement. Various devices for holding the rods on the conveyor belt may be provided. The action of the stripping device is conditioned by the movement of the rods. The device may be modified in its mode of operation to allow for the rod motion or the rod motion may be utilized to aid in effecting the action. One suitable form of stripping machine is described in the following, others being contemplated within the purview of the invention.

As the rods are brought to the stripping machine, they are uniformly orientated, uniformly spaced, and in uniform endwise alignment. Accordingly, for the stripping operation, it is necessary only securely to hold the rods while continuously advancing them, to rotate end rod about its axis, and to apply a stripping brush to the ends of such advancing and rotating rods. For that purpose, a belt 196 is arranged over the belt 184. The belt 196 is trained over pulleys 197 and 198. The shaft 199 of pulley 198 has a sprocket 200 fixed thereon and a chain 201 is trained over that sprocket and over the sprocket 202 fixed on the shaft 203. Rotation of the shaft 203 drives the belt 196. The drive for the shaft 203 will be described later. It will be observed that the ratio between the sprocket 200 and 202 is such that belt 196 is driven at a speed greater than the belt 184. The speed of rotation of shaft 203 is determined by the rate of travel of belt 184.

The pulleys 197 and 198 are supported for rotation in frame elements 204. Posts 205 connect with the frame 204, there being a pair of posts, one at each end of a pulley, for both pulleys, four posts in all. The posts 205 extend through bosses 206 on housing 207. The upper ends of the posts 204 are threaded as indicated at 208 and hand wheels 209 are screwed thereon. Springs 210 are arranged between the housing 207 and the frame elements 204. The posts 205 are freely movable through the bosses 206 and the springs 210 resiliently hold the frame elements 204 in a lowermost position. By adjusting the hand wheels 209, the spacing of the lower face of the belt 196 from the belt 184 may be varied.

Figures 3, 5:
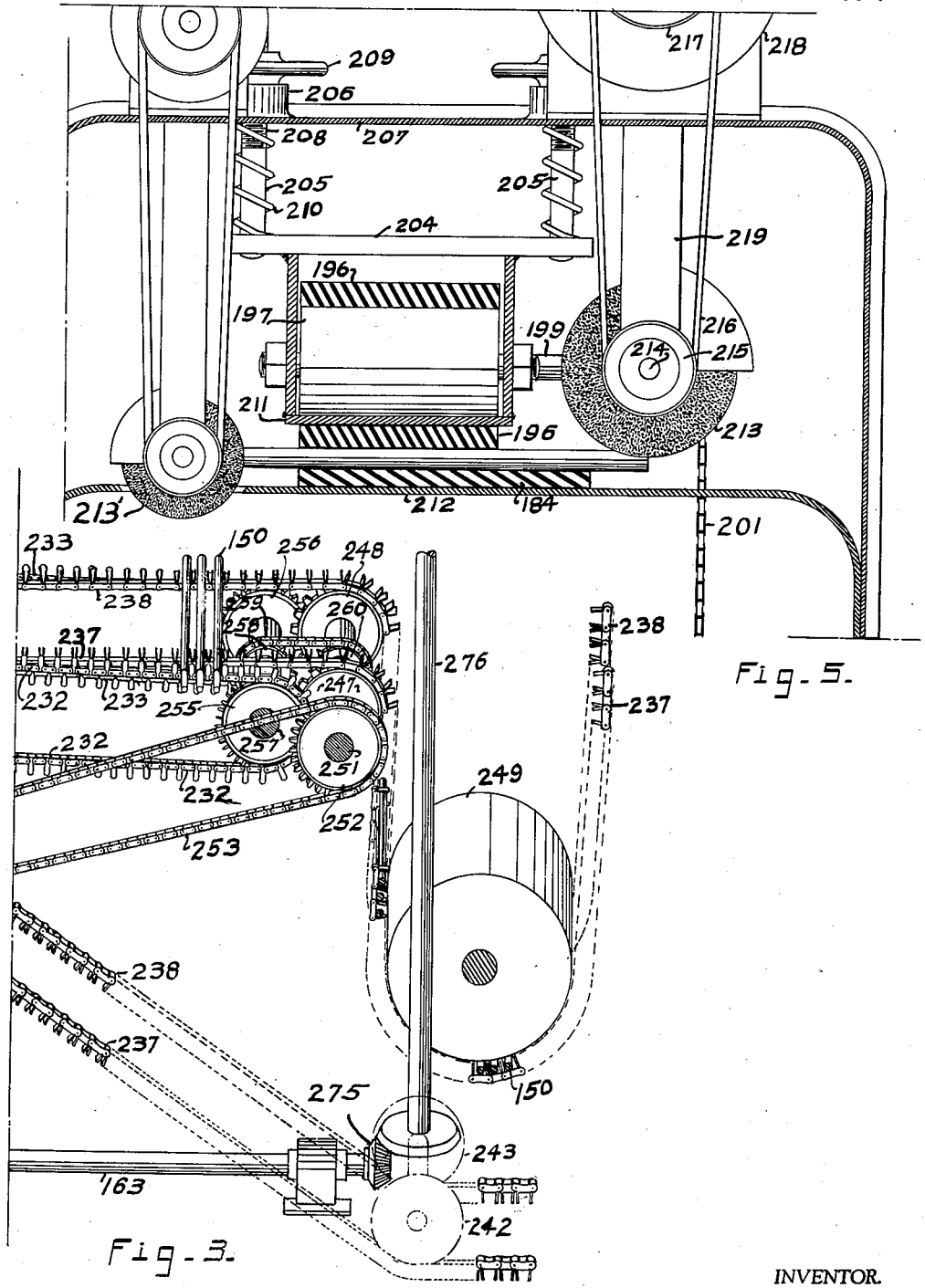
Figure 5 is a view, in cross section, illustrating the stripping and cleaning operations.

The framework for supporting the rollers 197 and 198, has a rigid plate 211 arranged to back and to support the lower flight of travel of the conveyor belt 196, as shown best in Figure 5. Where the belt 184 extends beneath the belt 196, the belt 184 is backed and supported by a rigid plate 212 carried by the housing of the machine. The belt 196 may be of comparatively soft, resilient material such as soft rubber composition, so as not to grip the welding rods so tightly as to mar the coating.

As the conveyor 184 advances, carrying the welding rods 150 beneath the pressure belt 196, the engagement of the belt 196 with the rods causes the rods to roll along the surface of the belt 184, due to the higher speed to travel of the belt 196 as compared to the belt 184. At the same time, the welding rods are securely gripped between the belts 184 and 196 due to the support afforded by the backing plates 211 and 212. The rods are in predetermined endwise position and the ends of the rods pass beneath the wire brush 213 which strips off the coating at the end of the rod. The coating is stripped off the end of the rod all around the core due to the fact that the rod is turned about its own axis by the rapid movement of the belt 196 compared to the belt 184.

The brush 213 is mounted on a shaft 214 which carries belt pulley 215. The brush is driven through belt 216 trained over belt pulley 217 fixed on the shaft of electric motor 218. The electric motor is mounted on the housing 207 in a conventional manner and the shaft 214 for the brush 213 is supported in bearings 219 depending from the housing.

After leaving the stripping machine the rods are carried forward by the joint movement of belts 184 and 196. Belt 184 extends around pulleys 221, 222, 223, 224, and 225. Power is supplied to the pulley 221 through the sprocket 226 mounted on the shaft 227. A chain 228 is trained over that sprocket and over sprocket 229 fixed on shaft 230 of reducer gear 231 connected with the power shaft 163. The power drive of the pulley 221 serves to drive the belt 184. The belt 184 drives the pulley 224 and thereby drives sprocket 173 and sprocket 169. Thus the power for driving the belt 184, the chains 179, the belt 165, the chains 185—186, the belt 196, all is derived from shaft 227 of pulley 220. This interconnecting drive maintains the various operating parts in proper co-ordination.

It will be noted that the ends of the rods 150 which first engaged the belt 152 when leaving the extruding machine, are the same ends which are stripped to bare the core of the welding rods. Thus, any imperfections in the flux coating incurred by the operation of the belt 152 in separating successive rods issuing from the extruding machine, are of no consequence since that part of the flux coating is later stripped off.

Figure 2:
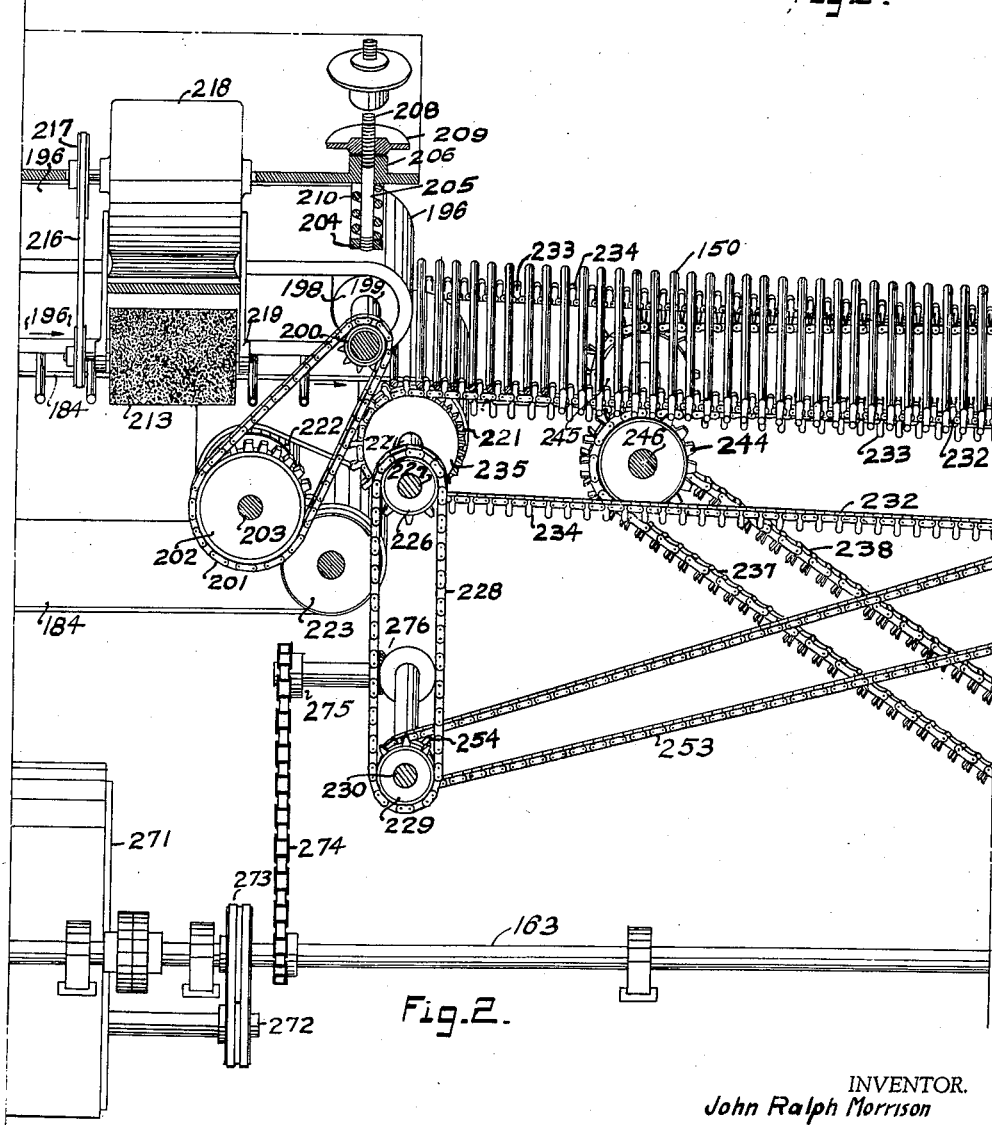

When a welding rod is put into use it should be in condition to "strike" the instant it is applied to the weld. Coating material adhering to the weld end of the rod may interfere with such action. If desired, the rods may be processed to clean the weld end of the rod. Figure 2 does not show such structure, such modification being illustrated in Figure 5. In Figure 5, a motor driven brush 213' is arranged to engage the weld ends of the rods, as the rods pass through the stripping operation. The mode of operation for effecting this processing is the same as that for the stripping operation, and reference is made to that description, in connection with the showing in Figure 5, for an explanation of the cleaning operation.

The rods now are ready to be baked. The next operation of the equipment of this invention is to load the rods onto a conveyor which runs through the baking oven. Such a conveyor is described in detail in my co-pending application, Serial Number 111,047 filed November 28, 1936, for Conveyors.

The conveyor is of the chain type. Parallel chains support the rods, near each rod end. The conveyor carries the rods in sidewise movement. The chains are provided with projections which extend from one side of each chain and lie substantially in the plane of chain flexibility. Such chain structure is illustrated in Figures 3 and 6. The projections are spaced apart to provide rod receiving spaces, open at the side distant from the chain, and bounded on the other sides by the faces of the projections and a base on the chain, between the projections. The problem of loading such a chain conveyor is to lodge the rods within the spaces between projections.

When the belt 184 passes around the pulley 221, the forward movement of the welding rods is continued by the chains 232 and 233. The chains 232 and 233 extend parallel to one another and are provided with projections 234 between which the rods 150 may lodge. The chains 232 and 233 are trained over sprockets 235, which are free to rotate upon the shaft 227. The sprockets 235 are adjacent to the ends of pulley 220. As the rods 150 reach the location where the belt 184 begins its travel about the pulley 221, the rods are engaged by the projections 234, rising toward the level of belt 184 as the chains 232 and 233 pass around sprocket 235 and carried forward, being supported by the chains 232 and 233. The support for the rods is provided by the chains 232 and 233 only, the rods being clear of obstruction between those chains which circumstance is incident to effecting the conveyor loading function.

One of the objectives in the operation of the rod conveyor is to conserve space. Accordingly, the rods are packed togther, on the conveyor, as closely as practicable. In the handling operations described heretofore, closeness of packing is secondary, the exigencies of handling, conversion of direction of movement, orientating, spacing, aligning, stripping, and cleaning being paramount. Accordingly, the spacing of the rods, in previous handling, is greater than that for the rod conveyor. The loading device must space the rods to accommodate the conveyor. The change in distance of rod spacing occurs at the transfer of the rods from belt 184 to chain 232 and 233, as may be observed in the drawings. To that end, the chains 232 and 233 are driven at a speed slower than belt 184, in such proportion, about one-half, as to allow for the difference in rod spacing.

The conveying element of the rod conveyor comprises two parallel chains 237 and 238 each of which is provided with upstanding projections so arranged that a rod may be supported between the projections, at the ends of the rod, the rod lying across the two chains and being moved sidewise by the conveyor. Figure 6 shows a chain 237. Each link of the chain is provided with a pair of upstanding projections 239 and a base 240, the ensemble affording a trough-like space 241 in which a rod may rest and be supported. The projections 239 are spaced apart far enough to permit free movement of the rods 152 into and out of the space 241.

In returning from a course of travel through the oven chamber, to the loading station, chains 237 and 238 are trained over sprockets 242 and 243 shown diagrammatically, conveyor chains 237 and 238 extend around the sprockets 244 and 245 fixed on a shaft 246 supported for rotation in bearings in a conventional manner, not shown. Sprockets 244 and 245 are arranged in proximity to and between loading chains 232 and 233. The conveyor chains 237 and 238 extend from sprockets 244 and 245 to and over sprockets 247 and 248, then around a pulley 249 and into the oven 250 where the chains pass through a successive series of flights of travel in substantially vertical directions. The sprockets 247 and 248 are fixed on a shaft 251 which also carries a sprocket 252. A chain 253 is trained over the sprocket 252 and engages with a sprocket 254 fixed on the shaft 230 of the reducer gear, driven by the power shaft 163. The drive of the sprockets 247 and 248 directly from the source of power insures that chains 247 and 248 will be kept taut between the sprockets 244 and 247 and the sprockets 245 and 248. Along the horizontal flight between sprocket pairs 244—247 and 245—248 the rods are loaded onto the conveyor chains 237 and 238.

The loading chains 232 and 233 extend around sprockets 255 and 256 fixed on the shaft 257. A sprocket 258 is fixed on shaft 257 and a chain 259 extends from the sprocket 258 to sprocket 260 fixed on the shaft 251. The chain drive of sprocket 258 from the shaft 251 insures that loading chains 232 and 233 will move in unison with the conveyor chains 237 and 238.

It will be observed that the sprockets for loading chains 232 and 233 are arranged relative to sprockets for the conveyor chains 237 and 238, so that the loading chains 232 and 233 are inclined slightly relative to the conveyor chains 237 and 238. As the loading chains 232 and 233 approach the conveyor chains 237 and 238, the loading chains are above the conveyor chains. The rods supported upon the loading chains between the projections 234 are above the ends of projections 239, on the conveyor chains. The chains are arranged so that the projections 234 line up with projections 239 in a manner illustrated in Figure 6. It will be observed that the projections 234 are large enough to cover up a juxtaposed pair of projections 239 so that rods 150 cannot take up a position between a pair of projections 234 such as to catch on the end of a projection 239 as the rods are lowered into the space between projections 239. The drive of the chains, before described, keeps the projections 234 in position to cover up juxtaposed pairs of projections 239 at all times. As the loading chains progress, due to their inclination relative to the conveyor chains, the rods 150 gradually are lowered down into the spaces 241 of the conveyor chain. This movement continues until the rods are transferred from the loading chains to the conveyor chains. Further travel of the conveyor and loading chains causes the projections 234 of the loading chains to drop below the conveyor chain thus freeing the loading chain from the rods 150 which have been placed upon the conveyor chain. Then the loading chains travel about sprockets 255 and 256 and return to sprockets 235 and 236 to continue the operation.

It will be observed that the projections 239 on each link of the conveyor chains are inclined toward one another slightly. This inclination of the projections 239 is provided to permit travel of the conveyor chains about a pulley such as indicated at 249 where the projections are on the inside of the arc of travel.

Plates 261 and 262 are arranged beneath the loading chains and the conveyor chains respectively, as shown in Figure 6, and serve to support those chains, in the flight of travel where loading takes place, against sagging, thereby further enhancing the certainty of effecting the loading function without failure. The plates 261 and 262 are supported on the framework of the machine in any suitable manner, not shown.

Power for operating the equipment described herein is supplied by electric motor 270 operating through gear reducer 271. A belt drive from the shaft 272 of the reducer to the shaft 163 is provided as shown at 273. As described before, shaft 163 supplies power through chain 161 to drive belt 152. The shaft 163 supplies power through chain 274 to sprocket and shaft 275 which, through bevel gears 276, drives shaft 230 of sprocket 229 and sprocket 254. Through chain 228, power is supplied in a manner before described for driving belt 184, belt 196, belt 165, chains 179, chains 185 and 186. Through chain 253 power is supplied for driving chains 237, 238, 232, and 233 in a manner described before. The shaft 163 also supplied power through bevel gears 275 into the shaft 276 which operates the rod conveyor in a manner described in my co-pending application beforementioned. This drive system supplies power at a predetermined rate to the various operating parts of the whole system and thereby maintains those parts in predetermined co-ordination at all times.

The invention has been described with reference to a particular sequence of operations. Obviously, the invention is not so limited. Certain operations may be altered, eliminated, or re-arranged in sequence. For example, the source of supply of rods may be from a stock, rather than directly from the coating operation. The initial movement of the rods may be in sidewise direction, obviating the necessity for converting endwise rod movement to sidewise rod movement. The operations of stripping and cleaning may be eliminated from the handling and loading sequence. Rods may be loaded directly from the coating operation or from a stock supply. Orientation, alignment, and spacing may be effected in various sequences and at various stages in the combination of operations. Other processing technique, of which stripping and cleaning are examples, may be substituted or added, and the operations of orientation, alignment, and spacing may be repeated at any stage during rod handling as may be desirable.

The invention has been described in detail by way of illustration. It is not intended so to limit the invention. Variations in details of construction may be made by one skilled in the art without departing from the scope of the invention as defined in the following claims.

What I claim as my invention is as follows:

1. In combination, means for feeding a succession of welding rods from a source of supply with sidewise movement in uniform orientation and in uniform endwise alignment; conveyor means for receiving said rods and continuously advancing the successive welding rods in sidewise direction, said rods having a coat of plastic material, a belt having a portion in spaced relation to the conveyor means to receive and to clamp advancing conveyor rods between the belt and the conveyor means, said belt portion and conveyor means having the same direction of travel, at least one end portion of each rod being exposed, a processing means including a motor driven brush arranged in the path of the exposed ends and operating to remove plastic material from the ends of the passing rods, and means for receiving the processed rods in succession and for maintaining the rods in spaced relation.

2. In combination, means for feeding a succession of welding rods from a source of supply with sidewise movement in uniform orientation and in uniform endwise alignment; conveyor means for receiving said rods and continuously advancing the successive welding rods in sidewise direction, said rods having a coat of plastic material, a belt having a portion in spaced relation to the conveyor means to receive and to clamp advancing conveyor rods between the conveyor means and the belt, said belt portion and conveyor means having the same direction of travel, at least one end portion of each rod being exposed, a processing means including a motor driven brush arranged in the path of the exposed ends and operating to remove plastic material from the ends of the passing rods, said conveyor means and said belt having different speeds of travel so as to rotate the clamped rods about the rod axes, and means for receiving the processed rods in succession and for maintaining the rods in spaced relation.

3. In combination, means for feeding a succession of welding rods from a source of supply with sidewise movement in uniform orientation and in uniform endwise alignment; a conveyor belt for receiving said rods and continuously advancing the coated welding rods in sidewise movement, a pressure belt arranged in spaced relation to the belt conveyor, the adjacent portions of the belts having movement in the same direction, there being backing means to support each belt at the distant sides of the adjacent portions, said pressure belt operating to engage and to clamp advancing rods on the conveyor belt with at least one end of each rod exposed, stripping means arranged in the path of travel of the exposed ends and operating to remove coating material at the rod end, the rates of travel of the belts being different so as to rotate the rods about the rod axes, and means for receiving the processed rods in succession and for maintaining the rods in spaced relation.

4. In combination with an extruding machine for coating rods, a rod conveyor comprising, an endless conveyor belt disposed in the path of flight of the rod as it leaves the extruding machine, a second endless conveyor belt normal thereto, a third endless conveyor belt aligned with the second named belt and disposed in oblique relation thereto, chains adjacent the edges of the last named belt, spaced projections on the chains, disposed in aligned relation with each other, a portion of the third named belt being disposed below the second named belt and spaced therefrom, a plate subjacent the discharge end of the second named belt and arranged substantially normal to the face of the third named belt, the free end of said plate terminating slightly above the top of the projections on said chains, and means coordinated with the third named belt for stripping the ends of the rod thereon.

5. In combination with an extruding machine for coating rods in end to end relation, a rod conveyor comprising, an endless belt arranged to move in the path of flight of the rods issuing from the extruding machine, a second endless belt in juxtaposition with the discharge end of the first named belt and arranged to move in a path normal thereto, the linear surface speed of the second named belt being greater than the rate of translation of the first named belt whereby successive rods received on the second named belt will be spaced apart, a third endless belt aligned with and oblique to the second named belt and having a portion thereof disposed subjacent the discharge end of the second named belt, projections on the third named belt for supporting the rods, received thereon from the second named belt in parallel relation and means coordinated with the third named belt for stripping the coating from the ends of the rods.

6. In combination, an endless belt for conveying rods in end to end relation thereon, a second endless belt disposed adjacent the discharge end of the first named belt and arranged to move in a path normal thereto, projections on the opposed edges of a portion of the second named belt for supporting the rods in parallel relation to each other and normal to the axis of the belt, a third endless belt aligned with the second named belt and disposed in spaced relation thereto, a portion of the third named belt being subjacent the discharge end of the second named belt and inclined upward therefrom, projections on the opposed edges of the third named belt for supporting the rods in parallel relation to each other and normal to the axis of the belt, and a fourth endless belt associated with the third named belt and driven at a greater lineal speed than the third named belt for rotating the rods about their axis.

7. In combination, an endless belt for conveying rods in end to end relation thereon, a second endless belt disposed adjacent the discharge end of the first named belt and arranged to move in a path normal thereto, projections on the opposed edges of a portion of the second named belt for supporting the rods in parallel relation to each other and normal to the axis of the belt, a third endless belt aligned with the second named belt and disposed in spaced relation thereto, a portion of the third named belt being subjacent the discharge end of the second named belt and inclined upward therefrom, chains adjacent the edges of said belt, projections thereon for supporting the rods in parallel relation to each other and normal to the axis of the belt, a fourth belt superjacent a portion of the third named belt and moved at a greater lineal speed than the rate of the third named belt, brushes disposed adjacent the edges of said fourth named belt and engageable with the end portions of said rods and a plate for supporting the portion of the third named belt in the zone of said brushes.

8. In combination with an extruding machine for coating rods in end to end relation, a conveyor mechanism for said rods comprising, a belt disposed adjacent the mouth of the extruding machine and arranged to convey the rods thereon in end to end relation, a transfer belt adjacent the discharge end of the first named belt and disposed normal thereto, the last named belt being driven at a greater lineal speed than the first named belt whereby successive rods will be loaded in spaced relation upon the second named belt, a third belt aligned with the second belt and arranged in angular relation thereto, a portion of the third named belt being superjacent the discharge end of the second named belt, chains adjacent the marginal edges of the third named belt, fingers disposed in spaced relation on said chains for supporting the rods falling from the second named belt in spaced parallel relation and normal to the axis of the belt, a fourth belt superjacent a portion of the third named belt, sprockets for said chains disposed in relation to said fourth named belt to effect the disengagement of the rods with said fingers after the rods are engaged with the fourth named belt.

JOHN R. MORRISON.